Jan. 30, 1968          G. DERDERIAN          3,365,892
TURBOMACHINE
Filed Aug. 10, 1965                                            3 Sheets-Sheet 1
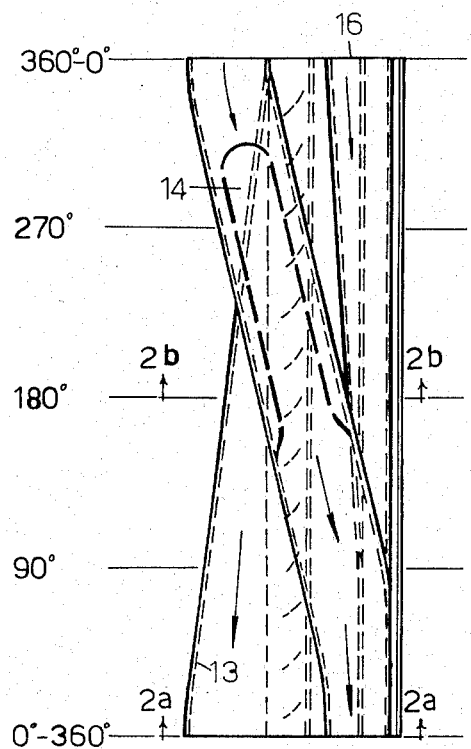
FIGURE 2
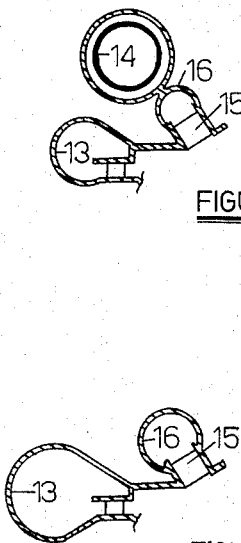
FIGURE 2b
FIGURE 2a
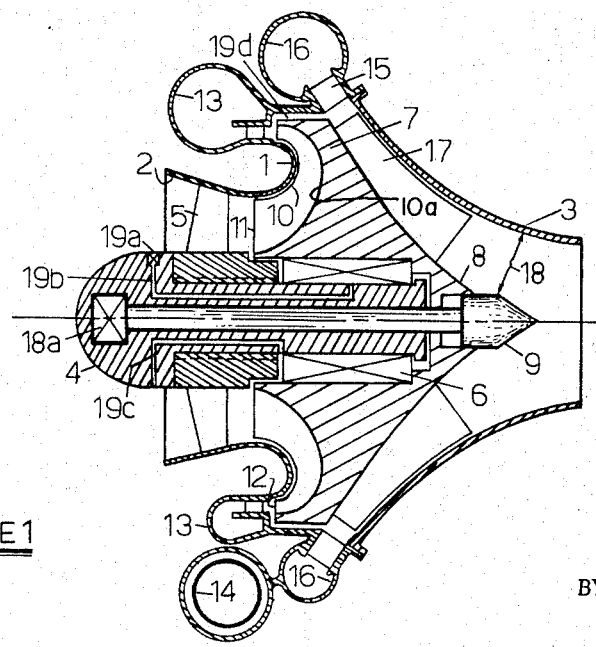
FIGURE 1
INVENTOR.
George Derderian
BY
Ralph Hammar
ATTORNEY Jan. 30, 1968  G. DERDERIAN  3,365,892
TURBOMACHINE
Filed Aug. 10, 1965  3 Sheets-Sheet 2

INVENTOR.
George Derderian
BY
Ralph Hammon
ATTORNEY

INVENTOR.
George Derderian
BY
Ralph Hammar
ATTORNEY

United States Patent Office 3,365,892
Patented Jan. 30, 1968

3,365,892
TURBOMACHINE
George Derderian, 11095 Lake Ave.,
Cleveland, Ohio 44102
Filed Aug. 10, 1965, Ser. No. 478,708
1 Claim. (Cl. 60—269)

ABSTRACT OF THE DISCLOSURE

A compressor for a turbine engine where the rotor disc is substantially normal to the flow of incoming air and formed with compartments, the inner sections of which receive the incoming air, pass it through the compartments to discharge the air substantially parallel to the flow of incoming air and in the opposite direction causing the air to flow through an angle of not less than 180°. The air is received by an annular diffuser chamber that changes the air flow not more than 180° to discharge into a combustor chamber, limiting the change of air flow to approximately 360°.

---

This invention relates to a turbomachine with emphasis on gas turbines and shows basic improvements in the construction of the components, as well as in the machine as a whole.

---

The innovations presented herein make it possible to mass produce gas turbines in the range of 1 H.P. to 2,500 H.P., which are priced competitively with similar-sized internal combustion engines, and with proper design, these gas turbines would have reasonable specific fuel consumption.

This turbomachine is a versatile device with wide commercial and military applications such as aircraft lift or main propulsion, rotor drive for helicopters, gas generating unit, auxiliary electrical or mechanical power units, motive power for trucks, automotive and marine use, turbosupercharges for internal combustion engines and gas turbine driven pumps or compressors.

A prime objective of this invention is to provide a light weight gas turbine engine with compact envelope and superior construction characteristics. This is accomplished by using the axial discharge centrifugal compressor which is adaptable to compact packaging in gas turbine engines, and by stressing design simplicity without compromising other objectives.

It is also an object to provide a gas turbine which is low in manufacturing and installation cost. The turbine wheel, turbine buckets and compressor impeller can be precision cast in one piece. The inlet, diffuser and discharge assembly can also be precision cast enabilng the required complex shapes to be manufactured accurately and economically. Many components such as seals, bearings and shafts can be either reduced in number, or excluded since they become unnecessary. The result can be a considerable cost savings in the manufacture of gas turbines. The unit's light weight and compactness allow for handling ease and the use of inexpensive support members.

It is another object to provide a gas turbine with higher structural performance. The main rotor disc supports both the compressor blades and the turbine blades. Said disc will give higher structural performance because the fluid being passed through the compressor impeller will cool the turbine blade support structure.

It is a further object to provide a gas turbine with increased reliability. Many of the turbomachine's principal features, such as the multiple functions of mechanical members, fewer bearings and seals, and higher structural performance, produce a high degree of reliability.

Figure 3:
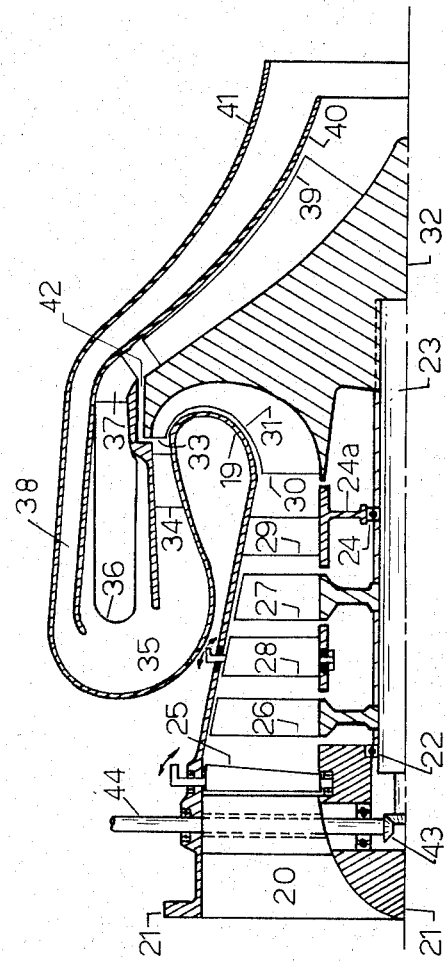
Figure 5:
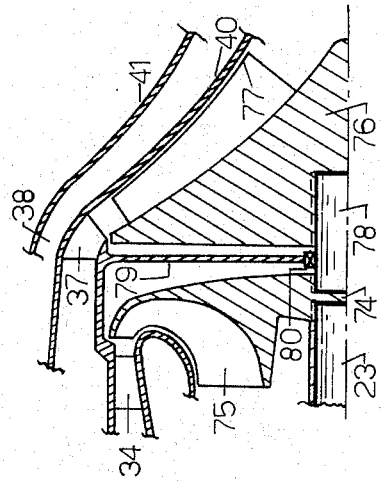
Figure 6:
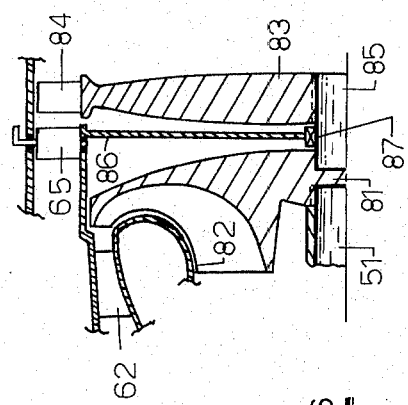

In the drawing, FIG. 1 is a longitudinal section through a gas turbine made by a plane which passes through the lines defined as 90° and 270° shown in FIG. 2; FIG. 2 is a developed view of the centrifugal compressor diffuser, combustor, and turbine scroll; FIGS. 2a and 2b are sections on correspondingly numbered lines on FIG. 2; FIG. 3 is a fragmentary section through a gas turbine, FIG. 4 is a fragmentary view through another gas turbine, FIG. 5 is a fragmentary section and a modification of FIG. 3, and FIG. 6 is a fragmentary section and a modification of FIG. 4.

Figure 4:
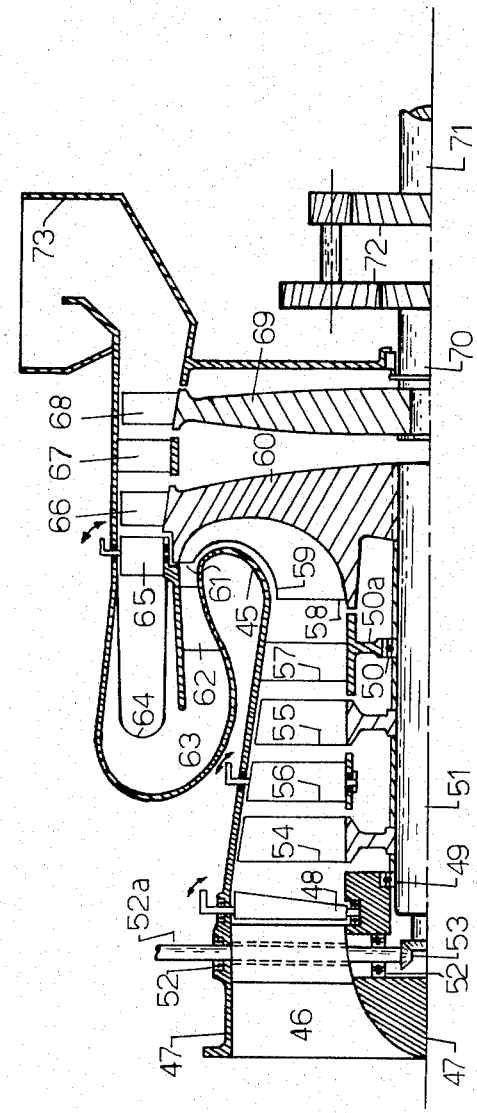

The gas turbines shown in FIGS. 1, 3, and 4 are of the open cycle type and can be adapted to regenerative cycle by modifying the engine through the addition of a regenerator.

FIG. 1 shows a gas turbine suitable for low power applications having a housing 1 with an air inlet 2 at one end and an exhaust nozzle 3 at the opposite ends. At the center of the inlet is a stationary shaft 4 carrying struts 5 and bearings 6 for a rotor disc 7 having a hub 8. An axially slidable shaft 9 at the center of the stationary shaft 4 defines the throat area of the exhaust nozzle 3. On the side of the rotor disc 7 facing the inlet 2 are fixed radially extending centrifugal compressor blades 10 having axially facing inlet ends 11 presented to the inlet 2 and axially facing outlet ends 12 radially outward of the inlet ends and presented axially in the same direction as the inlet ends and discharging axially into a diffuser 13 surrounding the air inlet tube. In other words, in addition to extending radially outward, the blades also extend axially through an angle of substantially 180° between the inlet and outlet ends of the blades. The projection of the edge 10a of each blade 10 secured to the disc on a plane through the edge 10a and the axis of the disc is of U-shape. The diffuser 13 also acts as a manifold for the compressed air. The particular diffuser shown is known as a scroll diffuser in which the diffuser and manifold functions are combined. The compressed air is fed along with the fuel in the usual manner to a combustor 14 and the hot gases from the combustor are discharged through nozzles 15 in a manifold 16 to centripetal turbine blades 17 on the side of the rotor disc 7 opposite the blades 10. The hot gases react on the turbine blades producing power to drive the rotor for centrifugal compression. The hot gases also are discharged through the exhaust nozzle 3 as a thrust producing jet.

Combustion characteristics prevent the application of extremely short combustion chambers; thus, in very small gas turbines, it is advantageous to have a combustor with adequate length such as in the combustor shown in FIG. 2, where the gases flow in a long circumferential path making several revolutions about the axis of the machine after leaving outlet ends 12 of the compressor blades 10, first passing through the scroll diffuser 13, then through the combustor 14 and subsequently into the turbine manifold 16.

Through suitable mechanism 18a, the shaft 9 is moved relative to the hub 8 to vary the cross sectional flow area of the throat 18 to maintain the desired pressure ratio across the exhaust nozzle 3 for efficient operation. For applications not requiring variable exhaust nozzle flow area, the shaft 9, mechanism 18a and the hole in the hub 8 are not required. Difficulties ordinarily encountered by flexural and torsional rotor vibrations problems are virtually eliminated with the extremely stiff rotating disc member shown in FIG. 1.

Another feature of the FIG. 1 gas turbine is the use of various types of rotor bearings including ball bearings, sleeve bearings or gas bearings. The lubricant enters through valve 19a and flows through passage 19b to rotor bearing 6, and has a return passageway 19c.

There is some air leakage past the tip 19d of the rotor disc which is radially outside and surrounds and shrouds the outlet ends 12 of the blades. This air leakage is used for cooling the casing and rotor and is then discharged into the main hot gas stream and is not wasted.

The turbomachine shown in FIG. 1 may be modified for use in turbosupercharger applications where the air discharged from the centrifugal compressor scroll diffuser 13 is ducted to the inlet of an internal combustion engine and the hot exhaust gases from the internal combustion engine are ducted into the turbine manifold 16 and passed through nozzles 15 to drive the rotor disc 7 by impinging on turbine rotor blades 17. The combustor 14 shown in FIGS. 1 and 2 is not required as the hot gases which drive the turbine are obtained from the internal combustion engine, and the shaft 9, mechanism 18a, and the hole in the hub 8 are also not required.

FIG. 3 shows a gas turbine which is suitable for aircraft propulsion. Said gas turbine includes an axial as well as a centrifugal compressor and uses a different form of diffuser and combustor from that shown in FIGS. 1 and 2.

The housing 19 has an air inlet 20 with a front frame 21 carrying bearings 22 for a rotor shaft 23. The rotor shaft bearings 24 are supported by the rear frame 24a. Near the front of the air inlet are variable pitch inlet guide vanes 25 journaled in the front frame. Fixed to the rotor shaft are axial compressor blades 26, 27 cooperating with stationary blades 28, 29. The stationary blades 28 are shown with variable pitch capability. The blades 26-29 form an axial compressor discharging to the axially facing inlet ends 30 of centrifugal compressor blades 31 carried by a rotor disc 32 fixed to the rotor shaft 23. The outlet ends 33 of the blades 31 face axially and in the same direction as the inlet ends 30. The compressed air discharged from the outlet ends 33 of the blades flows through an axial diffuser 34 surrounding the centrifugal compressor inlet. Upon passing through the diffuser vanes 34, the compressed air is received in an annular manifold 35, some of which flows through can-type combustors 36 feeding nozzles 37 and the balance of which flows through an annular bypass duct 38. Annular or cannular combustors may be substituted. From the nozzles 37 the hot gases flow through centripetal turbine blades 39 fixed to the rotor disc 32 and discharging through an exhaust nozzle 40 to produce a propulsion thrust jet. The annular nozzle 41 from the bypass duct surrounds the jet from the exhaust nozzle 40 and adds to the propulsion thrust. Some of the air discharged from the outlet ends of the centrifugal compressor vanes flows through passage 42 surrounding the tip of the rotor disc 32 and mixes with the hot gases from nozzle 37 to drive the turbine. This air leakage is used for cooling and is not wasted. For pure jet applications the bypass duct 38 and nozzle 41 are not required and all the flow in manifold 35 flows into the combustors 36. In applications requiring the delivery of compressed air, the bypass duct 38 may be manifolded and used as an air supply.

The accessories for the gas turbine are driven from the rotor shaft 23 through gearing 43 driving a drive shaft 44.

FIG. 4 shows a gas turbine similar to that in FIG. 3 but designed for shaft power output rather than for jet propulsion. This gas turbine is of the free wheel type in which one turbine drives the compressor and accessories and another turbine having no mechanical connection with the first turbine drives the power shaft through appropriate gearing. In this gas turbine there is a housing 45 having an air inlet 46 with a front frame 47 and variable pitch inlet guide vanes 48 journaled in the front frame. The front frame 47 holds bearings 49 and bearings 50 are held by rear frame 50a for the rotor shaft 51. The front frame 47 has bearings 52 for an accessory drive shaft 52a driven from the rotor shaft 51 through gearing 53. Fixed to the rotor shaft are two sets of axial compressor blades 54 and 55 associated with stationary blades 56 and 57, the blades 56 being shown as of variable pitch. The outlet from the axial compressor discharges directly to the axially facing inlet ends 58 of centrifugal compressor blades 59 fixed to a rotor disc 60 on the shaft 51. The axially facing outlet ends 61 of the blades 59 discharge axially into diffuser vanes 62 surrounding the compressor inlet. The compressed air collects in a manifold 63 feeding a suitable combustor 64 discharging through variable pitch turbine nozzle blades 65 feeding axial flow turbine blades 66 attached to the periphery of the rotor disc 60. The discharge from the turbine blades 66 flows through nozzles 67 to turbine blades 68 on a turbine wheel 69 fixed to a shaft 70 driving an output shaft 71 through reduction gearing 72. In this construction, the turbine blades 66 provide the power to drive the air compressor while the turbine wheel 69 provides the power to drive the output shaft 71. The speeds of rotation of the turbine wheels may be different. Upon leaving the turbine wheel 68, the hot gases flow through a suitable outlet 73. Although FIG. 4 shows a free power turbine driving shaft 70, the main compressor-turbine rotor shaft 51 can be directly connected to shaft 70 to drive an output shaft 71 through reduction gear 72. Also, the combustor 64, shaft 70 and associated turbine 68, nozzles 67, gears 72, and shaft 71 may be omitted and the first stage turbine 66 can drive the compressor in turbosupercharger applications supplying supercharged air from the manifold 63.

The gas turbines shown in FIGS. 1, 3 and 4 are short in axial length because the diffuser and combustor sections are in effect folded back over the air inlet. By using the axial discharge centrifugal compressor, the length of the disclosed gas turbine will be shorter than a conventional gas turbine, by an amount equal to the axial length of the combustor section in a conventional gas turbine. In addition, the outside diameter of the disclosed gas turbine will be approximately two-thirds the outside diameter of a conventional gas turbine which uses a conventional centrifugal compressor that diffuses radially.

The main rotor disc design is simple, rugged and ideal for compact arrangement. The main rotor disc shown in FIGS. 1, 3 and 4 functions as the common support structure for the centrifugal compressor blades and turbine blades. The multiple functions of the rotor disc make it possible to reduce the total number of parts, thereby simplifying the system. For the same reason, it is possible to precision cast the main rotor disc, which includes the compressor and turbine blading, in one piece. There are applications where the compressor and turbine may have to be fabricated separately. For such application, configurations such as shown in FIGS. 5 and 6 may be used.

FIG. 5 shows a fragmentary section through a gas turbine that is a modification of the gas turbine shown in FIG. 3. The rotor disc 32, shown in FIG. 3, which holds both the compressor blades 31 and the turbine blades 39 and is connected to shaft 23, is replaced by the two rotor discs shown in FIG. 5, namely, the compressor rotor disc 74 holding the centrifugal compressor blades 75 and the turbine rotor disc 76 holding the centripetal turbine blades 77. The centrifugal compressor rotor disc 74 is fixed to shaft 23 on one side and shaft 78 on the other side. Shaft 78 connects the two rotor discs 74 and 76. Said discs are sealed from each other by the structure 79 which holds seal 80.

FIG. 6 shows a fragmentary section through a gas turbine that is a modification of the gas turbine shown in FIG. 4. The rotor disc 60, shown in FIG. 4, which holds the compressor blades 59 and the axial turbine blades 66 and is fixed to shaft 51, is replaced by the two rotor discs shown in FIG. 6, namely, the compressor rotor disc 81 holding the centrifugal compressor blades 82 and the turbine rotor disc 83 holding the axial turbine blades 84. The centrifugal compressor rotor disc is fixed to shaft 51 on one side and shaft 85 on the other side. Shaft 85 connects the two rotor discs 81 and 83. Said discs are sealed from each other by the structure 86 which holds seal 87.

Thermal barrier coatings and/or corrosion-protective coatings may be applied to parts or regions exposed to elevated temperatures consistent with the environmental requirements as would be used in conventional gas turbines.

While a detailed description of the preferred embodiments of the invention has been disclosed, it will be obvious to those skilled in the art, that various changes or modifications may be made therein without departing from the scope of the invention or fair meaning of the subjoined claims.

What is claimed as new is:

1. In a jet engine having a combustor chamber, turbine blades and an exhaust, a centrifugal compressor comprising
   a housing having a front frame, supporting bearings which journal a longitudinally positioned rotor shaft, said housing forming an air intake passage substantially parallel to the rotor shaft;
   a rotor disc journalled on said rotor shaft having its forward face substantially normal to said rotor shaft and to the flow of incoming air, said face being formed with an annular recess;
   blades mounted in, and conforming to the curve of the bottom of the recess, said blades dividing the rotor disc forward face into a series of compartments, the inner sections of said compartments being in the path of the incoming air, the outer sections of said compartments being removed from the path of the incoming air, the air intake passage of the housing delivering air, substantially parallel to the axis of the rotor shaft, to said inner sections of the compartments, said airflow being guided by the blades throughout the extent of the recess compartments, flowing through an angle of at least 180° in said recess compartments, and discharging from the outer sections of said compartments in a direction substantially opposite to the flow of the incoming air;
   an annular diffuser chamber formed as part of the housing receiving the discharged air from the rotor disc and changing the direction of air flow by not more than 180°, and discharging the air to the engine combustor chamber;
   whereby the flow of air is subjected to no more than two substantially 180° turns.

References Cited

UNITED STATES PATENTS

| | | | |
|---|---|---|---|
| 2,256,198 | 9/1941 | Hahn | 60—39.36 |
| 2,557,131 | 6/1951 | Miller | 60—39.37 |
| 2,601,612 | 6/1952 | Imbert | 60—39.37 |
| 2,610,465 | 9/1952 | Imbert | 60—262 |
| 2,651,492 | 9/1953 | Feilden | 230—114 |
| 2,658,338 | 11/1953 | Leduc | 60—39.36 |
| 2,694,291 | 11/1954 | Rosengart | 60—39.36 |
| 2,709,893 | 6/1955 | Birmann | 60—39.96 |
| 2,738,645 | 3/1956 | Destival | 60—262 |
| 3,093,084 | 6/1963 | Derderian | 103—87 |

FOREIGN PATENTS

| | | |
|---|---|---|
| 1,022,629 | 12/1952 | France. |
| 1,038,537 | 5/1953 | France. |
| 456,980 | 11/1936 | Great Britain. |
| 552,391 | 4/1943 | Great Britain. |
| 583,253 | 10/1958 | Italy. |

CARLTON R. CROYLE, *Primary Examiner.*

MARK M. NEWMAN, *Examiner.*

D. HART, *Assistant Examiner.*